(12) United States Patent
Arimilli et al.

(10) Patent No.: US 6,502,168 B1
(45) Date of Patent: Dec. 31, 2002

(54) CACHE HAVING VIRTUAL CACHE CONTROLLER QUEUES

(75) Inventors: Ravi Kumar Arimilli, Austin, TX (US); John Steven Dodson, Pflugerville, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,028

(22) Filed: Sep. 23, 1999

Related U.S. Application Data

(62) Division of application No. 08/839,478, filed on Apr. 14, 1997.

(51) Int. Cl.[7] .......................... G06F 12/00; G06F 12/14; G06F 12/16
(52) U.S. Cl. .................. 711/119; 711/141; 711/142; 711/144; 711/162; 711/203
(58) Field of Search ................. 711/203, 141, 711/144, 142, 162, 119

(56) References Cited

U.S. PATENT DOCUMENTS

| 4,807,110 A | * | 2/1989 | Pomerene et al. | ......... 364/200 |
|---|---|---|---|---|
| 5,832,250 A | * | 11/1998 | Whitaker | ..................... 395/471 |
| 6,049,851 A | * | 4/2000 | Bryg et al. | ................. 711/141 |
| 6,338,123 B2 | * | 1/2002 | Joseph et al. | ............... 711/144 |

FOREIGN PATENT DOCUMENTS

| JP | 1263762 | 10/1989 |
|---|---|---|
| JP | 3127157 | 5/1991 |
| JP | 5210640 | 8/1993 |

* cited by examiner

Primary Examiner—Hiep T. Nguyen
Assistant Examiner—Ngoc Dinh
(74) Attorney, Agent, or Firm—Mark E. McBurney; Bracewell & Patterson, L.L.P.

(57) ABSTRACT

According to the present invention, a data processing system includes a cache having a cache directory. A status indication indicative of the status of at least one of a plurality of data entries in the cache is stored in the cache directory. In response to receipt of a cache operation request, a determination is made whether to update the status indication. In response to the determination that the status indication is to be updated, the status indication is copied into a shadow register and updated. The status indication is then written back into the cache directory at a later time. The shadow register thus serves as a virtual cache controller queue that dynamically mimics a cache directory entry without functional latency.

11 Claims, 3 Drawing Sheets

CACHE HAVING VIRTUAL CACHE CONTROLLER QUEUES

This is Division of application Ser. No. 08/839,478, filed Apr. 14, 1997, currently pending.

BACKGROUND OF THE INVENTION

1. Technical Field:

The present invention relates in general to an improved method and system for data processing. In particular, the present invention relates to an improved method and system for data communication in a data processing system and an improved method and system for cache management in a data processing system.

2. Description of the Related Art:

A conventional symmetric multiprocessor data processing system may include a number of processors that are each coupled to a shared system bus. Each processor may include an on-board cache that provides local storage for instructions and data, execution circuitry for executing instructions, and a bus interface unit (BIU) that supports communication across the shared system bus according to a predetermined bus communication protocol.

In conventional multiprocessor data processing systems, each BIU maintains a single queue of all outstanding communication requests generated within the processor. The communication requests indicate a request address and a request source within the processor. To promote maximum utilization of the system bus, the BIUs typically service the communication requests utilizing split bus transactions, which permit multiple bus transactions to be chronologically interleaved. For example, the BIU of a first processor may gain ownership of the system bus and initiate a first bus transaction by driving an address and appropriate control signals. The first processor may then relinquish ownership of the system bus while awaiting receipt of data associated with the address in order to permit a second processor to perform a portion of a second bus transaction. Thereafter, the device from which the first processor requested data may complete the first bus transaction by driving the requested data, which is then latched by the BIU of the first processor. To allow devices snooping the system bus to identify the bus transaction to which each transaction portion belongs, each BIU assigns each of its bus transactions an arbitrary bus tag that is transmitted during each tenure of the bus transaction. The bus tags are typically assigned cyclically out of a pool of bus tags equal in number to the maximum number of concurrent bus transactions supported by the device. For example, the BIU of a device supporting a maximum of eight concurrent bus transactions assigns one of eight low order 3-bit tags to each of its bus transactions The bus tags are stored by the device in association with the appropriate queue entries.

Although employing split bus transactions tends to maximize bus utilization, supporting split bus transactions concomitantly increases device complexity due to the allocation logic required to dynamically allocate and deallocate bus tags and the. associative logic utilized to determine which bus transaction is associated with each snooped bus tag. In addition, decoding each bus tag prior to routing retrieved data to the appropriate request source within a processor introduces latency in a critical timing path, thereby degrading processor performance.

A second source of performance problems within a conventional data processing system is the manner in which caches handle updates. Data processing system caches are typically set associative and accordingly contain a number of congruence classes that each include a number of ways or members. Each of the members can store a cache line of data, for example, 64 bytes. As is well-known to those skilled in the art, the cache line stored within each congruence class member is recorded in an associated directory entry utilizing a tag portion of the cache line address. The directory entry also stores the current coherency state of the associated congruence class member. An update to a congruence class member therefore entails an update of either or both of the tag and coherency state of the corresponding directory entry. Prior art data processing systems handle an update operation by holding off all other processor requests and snoops mapping to a congruence class member until the update to the corresponding directory entry update is complete. The deferral of service for processor requests and snoops causes de facto serialization of cache requests in cases in which multiple requests specifying the same congruence class member are received.

As should thus be apparent, it would be desirable to provide an improved method and system for data processing. In particular, it would be desirable to provide an improved method and system for identifying split bus transactions. In addition, it would be desirable to provide a method and system for performing cache updates that minimize contention for frequently accessed cache lines.

SUMMARY OF THE INVENTION

It is therefore one object of the present invention to provide an improved method and system for data processing.

It is another object of the present invention to provide an improved method and system for data communication in a data processing system.

It is yet another object of the present invention to provide an improved method and system for cache management in a data processing system.

The foregoing objects are achieved as is now described. According to a first aspect of the present invention, a data processing system is provided that includes a communication network to which multiple devices are coupled. A first of the multiple devices includes a number of requesters, which are each permanently assigned a respective one of a number of unique tags. In response to a communication request by a requester within the first device, a tag assigned to the requestor is transmitted on the communication network in conjunction with the requested communication transaction. According to a second aspect of the present invention, a data processing system includes a cache having a cache directory. A status indication indicative of the status of at least one of a plurality of data entries in the cache is stored in the cache directory. In response to receipt of a cache operation request, a determination is made whether to update the status indication. In response to the determination that the status indication is to be updated, the status indication is copied into a shadow register and updated. The status indication is then written back into the cache directory at a later time.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
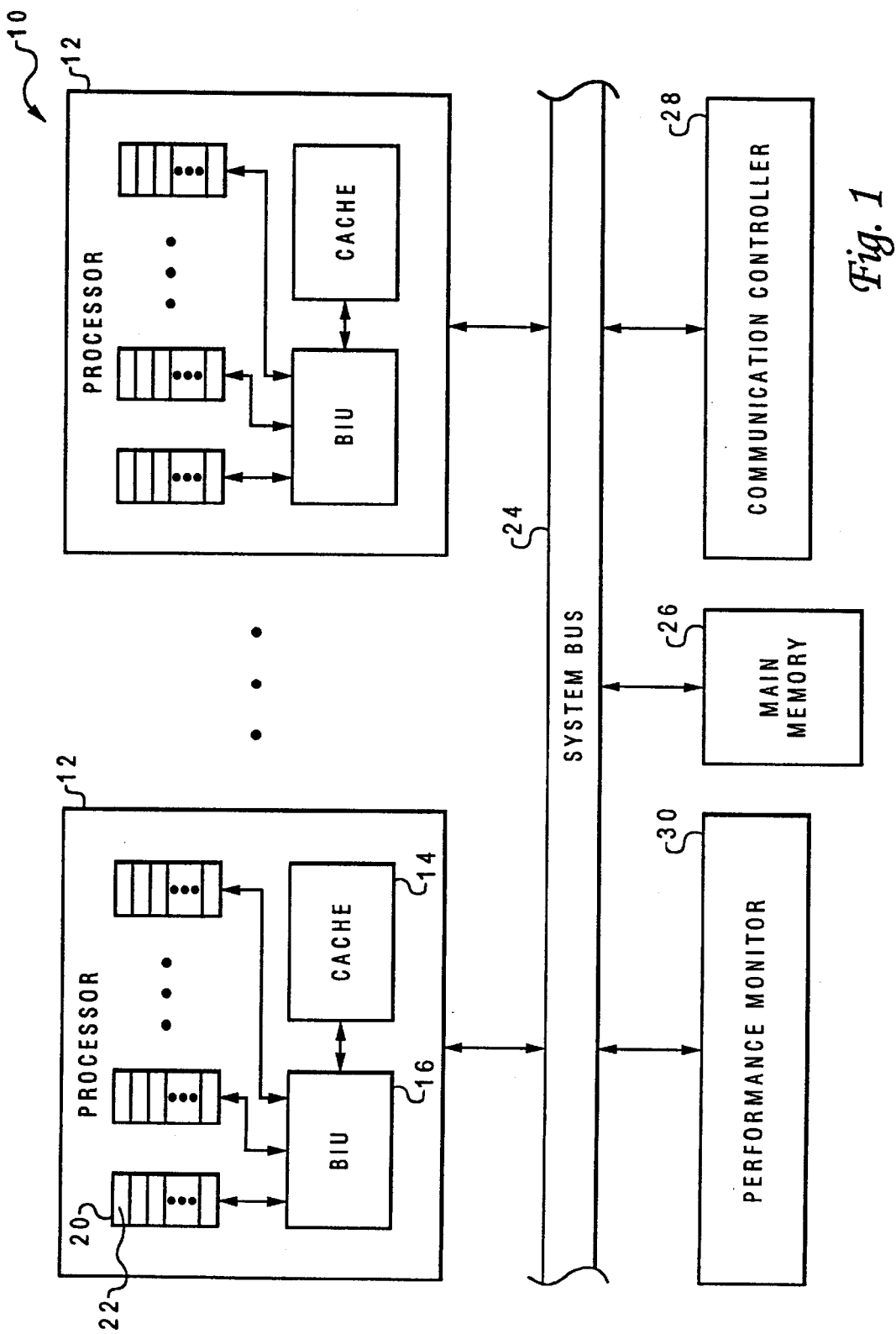
FIG. 1 depicts an illustrative embodiment of a data processing system, which, in accordance with the present invention, utilizes a fixed bus tag to identify the source of a communication transaction.

With reference now to the figures and in particular with reference to FIG. 1, there is depicted an illustrative embodiment of a data processing system with which the present invention may advantageously be utilized. As illustrated, data processing system 10 comprises a symmetric multiprocessor data processing system including at least two processors 12 plus optional additional processors indicated by ellipsis notation. Each of processors 12 includes on-board level one (L1) cache 14 that provides local storage for instructions and data. In addition, each of processors 12 includes a bus interface unit (BIU) 16, as well as processing resources and other logic generally represented as a plurality of instruction-level queues 20. Each queue 20 includes at least one entry 22, and like cache 14, is coupled to BIU 16. From the perspective of BIU 16, cache 14 and queues 20 comprise requesters that generate communication requests, which BIU 16 services by performing communication transactions on shared system bus 24.

As illustrated, data processing system 10 further includes main memory 26, communication controller 28, and performance monitor 30. Communication controller 28 apportions ownership of system bus 24 among the various devices to which system bus 24 is coupled based upon device (or requestor) priorities. As is described further herein below, the present invention permits communication controller 28 to dynamically vary the priorities of devices (or requesters) coupled to system bus 24 in response to bus tags associated with communication transactions. As its name implies, performance monitor 30 monitors selected events within data processing system 10 that are indicative of system performance. For example, performance monitor 30 can be configured to count the number of write operations targeting main memory 26, count the number of read operations targeting main memory 26, and determine the utilization of system bus 24. The use of fixed bus tags in accordance with the present invention also permits performance monitor 30 to infer and therefore monitor the occurrence of events internal to devices coupled to system bus 24, and in particular, events internal to processors 12.

To maximize the utilization of system bus 24, devices within data processing system 10 preferably communicate across system bus 24 utilizing split bus transactions. In contrast to prior art data processing systems, which typically assign arbitrary bus tags to communication transactions in order to identify the communication transaction to which each bus tenure belongs, data processing system 10 utilizes fixed bus tags that are permanently assigned to each source of communication requests. Thus, with reference to processors 12, a unique fixed bus tag can be assigned to each queue 20, or more preferably, to each entry 22 of each queue 20.

In response to receipt of a communication request generated by a particular entry 22 of a queue 20, BIU 16 services the communication request by initiating a communication transaction on system bus 24 that includes the fixed bus tag assigned to the requesting entry 22, appropriate control signals, an address, and/or data. Because the fixed bus tag assigned to the requesting entry 22 is transmitted in conjunction with each tenure the bus transaction, devices snooping system bus 24 can readily determine not only that a particular processor 12 initiated the bus transaction, but also a specific source of the request within processor 12. The snooping devices can therefore infer additional information about the communication transaction and the requestor. For example, communication controller 28 can be configured to recognize selected bus tags permanently assigned to "high water mark" entries 22 within queues 20. In response to a detection a bus tag assigned to a "high water mark" entry 22, communication controller 28 can accord requests sourced by the queue 20 to which the high water mark entry 22 belongs (or all communication requests sourced by that processor 12) a higher priority in order to preferentially service requests within the queue 20 until the number of queue entries 22 drops below a selected "low water mark." As noted above, the use of fixed bus tags also provides an advantage to performance monitor 30. By using fixed bus tags rather than arbitrary dynamically-assigned bus tags, performance monitor 30 can monitor events internal to processors 12 (or other devices coupled to system bus. 24) rather than only events directly pertaining to system bus 24. Due to the statistical nature of cache behavior, the capability of monitoring events internal to a device is particularly advantageous for observing the behavior of queues within a cache. The robust performance monitoring capability provided by the present invention is useful for not only debugging prototype hardware, but also for tuning data processing system operation through hardware and/or software optimization.

Figure 2:
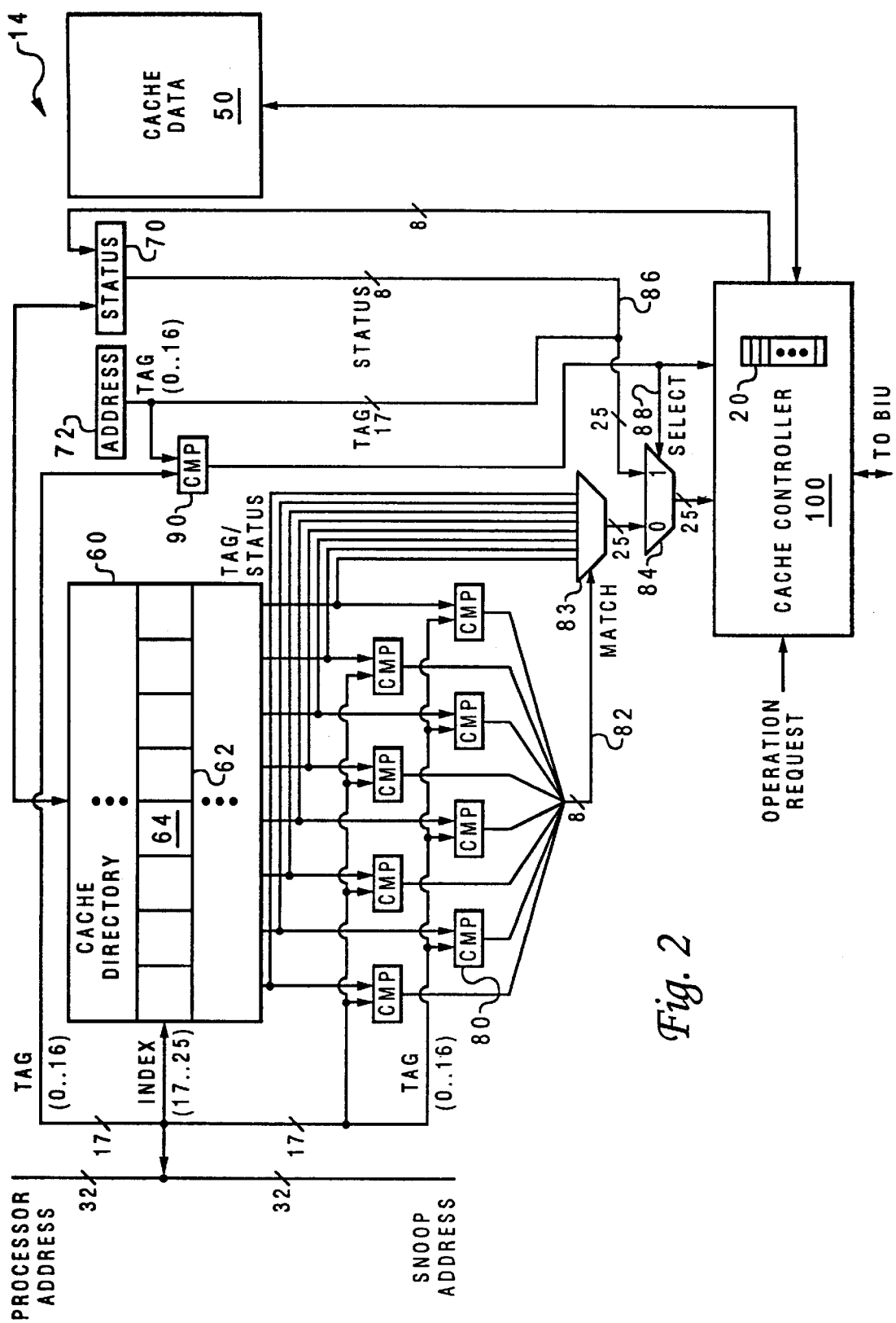
FIG. 2 illustrates a more detailed block diagram representation of a cache within the data processing system illustrated in FIG. 1.

Referring now to FIG. 2, there is illustrated a more detailed block diagram representation of cache 14 in one of processors 12. In the depicted embodiment, cache 14 comprises an 8-way set-associative cache that utilizes 32-bit addresses. Accordingly, cache data 50 is composed of a number of congruence classes that each contain 8 members for storing cache lines. The cache lines stored within cache data 50 are recorded in cache directory 60, which contains a number of sets 62 that each correspond to one of the congruence classes within cache data 50. A set 62 contains 8 entries 64 that each store the tag and status of the cache line within an associated member of the congruence class with which the set 62 corresponds. The status stored within an entry 64 can indicate the coherency (e.g., MESI) state, the inclusivity, and other cache line attributes.

In accordance with the present invention, cache 14 further includes at least one shadow register 70, which temporarily stores the status of a cache line while the directory entry 64 corresponding to the congruence class member storing the cache line is being updated. Shadow register 70 has an associated address register 72 for storing an indication of the address of the cache line. In order to minimize the amount of comparative logic utilized to determine which cache line is referenced by the contents of address register 72, cache 14 can include, in an alternative embodiment to that illustrated in FIG. 2, one shadow register-address register pair associated with each congruence class of cache 14.

During operation of data processing system 10, cache 14 can receive cache operation requests including request addresses from either its associated processor 12 or from system bus 24 via BIU 16. As illustrated in FIG. 2, index bits 17–25 of each request address received by cache 14 are input into cache directory 60, which utilizes the index bits to select a particular set 62. The 17-bit tag and 8-bit status stored within each entry 64 of the selected set 62 form one of the eight 25-bit inputs of multiplexer 83. The 8 tags output by cache directory 64 are also individually compared with tag bits 0–16 of the request address utilizing comparators 80, which each produce a 1-bit match indication. The 8 bits output by comparators 80 together form a decoded MATCH signal 82 that selects one of 25-bit tag and status indications input into multiplexer 83 as an output (if the request address hits in cache directory 60). The output of multiplexer 83 is connected to a first 25-bit input of multiplexer 84.

The second 25-bit input of multiplexer 84 is connected to TAG and STATUS signal 86, which indicates the tag bits of the cache line address stored within address register 72 and the status stored within shadow register 70. Multiplexer 84 selects one of its inputs as an output based upon the state of SELECT signal 88, which is generated by comparator 90 in response to a comparison of the tag bits of the request address and the tag bits of the cache line address stored in address register 72. Thus, in response to a request address hitting in address register 72, SELECT signal 88 is asserted and multiplexer 84 outputs the 25-bit tag and status indication received from address register 72 and shadow register 70. Alternatively, in response the request address missing in address register 72, SELECT signal 88 is not asserted, and multiplexer 84 outputs a 25-bit tag and status indication received from cache directory 60. Still referring to FIG. 2, cache 14 further includes cache controller 100, which performs data handling and cache update operations in response to SELECT signal 88, the 25-bit tag and status indication output by multiplexer 84, and an indication of the cache operation request containing the request address. The action taken by cache controller 100 in response to a cache operation request depends upon not only the type of cache operation request received, but also upon the implemented coherency protocol and the status of the cache line specified by the request address. Actions that may be taken by cache controller 100 include supplying data to processor 12, requesting data from main memory 26, writing back castout data from cache data 50 to main memory 26, storing data within cache data 50, and updating a cache line status within cache directory 60. As illustrated in FIG. 2, writes to and reads from main memory 26 performed by cache controller 100 may be handled utilizing one or more queues 20 like that discussed above with respect to FIG. 1.

Figure 3:
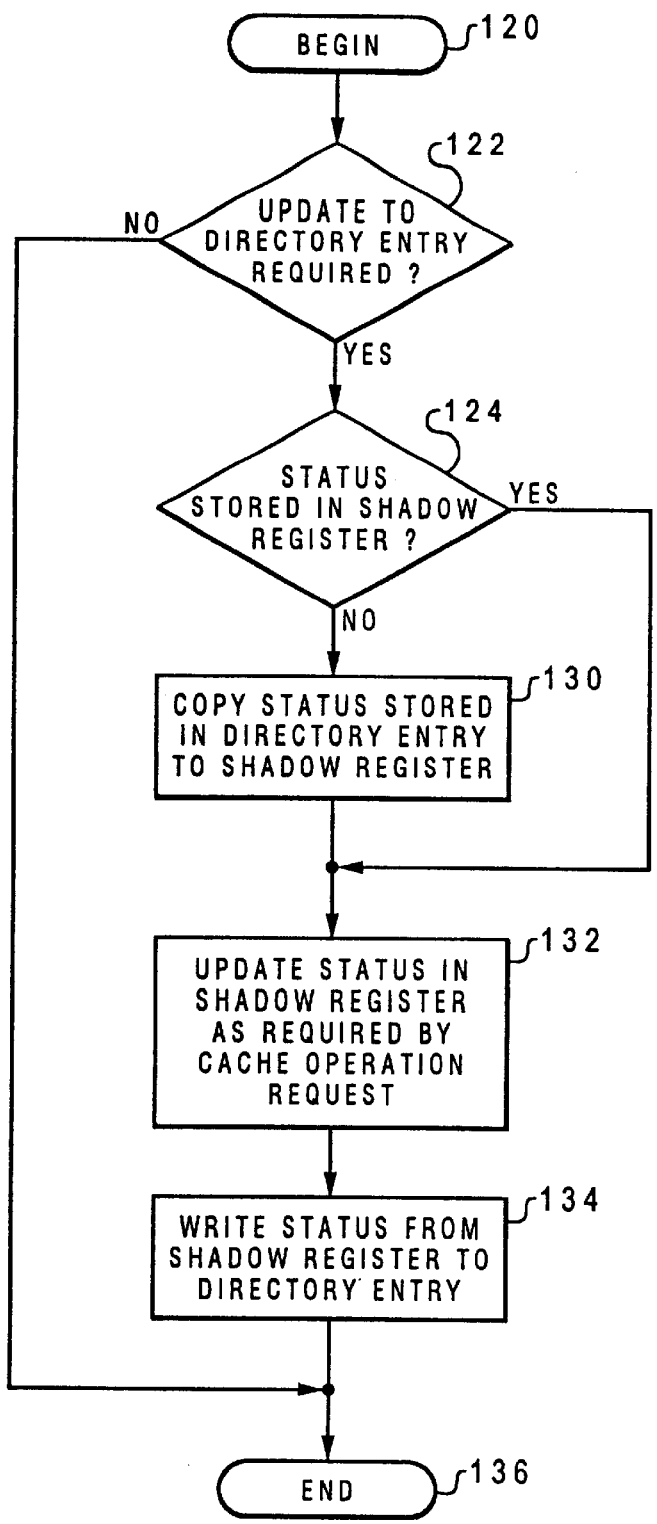
FIG. 3 is a flowchart depicting a method for updating an entry within a cache directory in accordance with the present invention.

According to the present invention, in each case that an update to an entry 64 of cache directory 60 is required, such updates are performed utilizing shadow register 70 in order to minimize contention for cache directory 60. With reference now to FIG. 3, there is depicted an illustrative embodiment of a method by which cache controller 100 updates the status of a cache line utilizing shadow register 70. As illustrated, the process begins at block 120 in response to receipt of a cache operation request by cache 14. As described above with reference to FIG. 2, the request address is utilized to generate SELECT signal 88 and the 25-bit tag and status indication output by multiplexer 84. The process then proceeds from block 120 to, block 122, which depicts cache controller 100 determining whether or not an update to a directory entry 64 is required in response to the cache operation request. If not, cache controller 100 performs any data handling operations required by the cache operation request. Thereafter, the process passes to block 136 and terminates.

However, in response to a determination at block 122 that an update to a directory entry 64 is required in response to the cache operation request, the process passes to block 124. Block 124 depicts a determination of whether or not the status of the cache line specified by the request address is stored in shadow register 70. Cache controller 100 makes the determination illustrated at block 124 by testing SELECT signal 88, which indicates whether or not the cache line address hit in address register 72. In response to a determination at block 124 that the status of the cache line specified by the request address is stored within shadow register 70, the process proceeds to block 132, which is described below. However, in response to a determination at block 124 that the status of the specified cache line is not stored within shadow register 70, the process proceeds from block 124 to block 130, which depicts cache controller 100 copying the status of the specified cache line into shadow register 70.

Importantly, the status of the specified cache line is copied into shadow register 70 such that the status is available during the clock cycle following receipt of the cache operation request. This permits other cache operation requests specifying the same cache line to be serviced with minimal latency. Thus, the use of shadow register 70 increases the availability of a cache line status over prior art caches that, in response to a determination that a directory update is required, perform a directory write to change the status of the directory entry to an "allocate" state. As described above, in prior art data processing systems, cache operation requests specifying a cache line in or making a transition to the allocate state are held off (e.g., retried) until the update to the directory entry is complete. The present invention also has the advantage of not requiring a directory write to update a directory entry 64 to an "allocate" state, which leaves one of the limited number of directory write ports available for use by another directory update operation.

Following block 130, the process proceeds to block 132. Block 132 illustrates cache controller 100 updating, within shadow register 70, the status of the cache line specified by the cache operation request in accordance with the coherency protocol. As indicated by the path between blocks 124 and 130, the cache line status stored within shadow register 70 can be updated by multiple cache operation requests prior to being written to cache directory 60. For example, in response to receipt of a cache operation request indicating a read with intent to modify operation, cache controller 100 copies the status of the cache line specified in the cache operation request to shadow register 70 and updates the coherency component of the status to the exclusive (E) state. If a snoop indicating a read request is received prior to the status being written back to cache directory 60, the status within shadow register 70 is updated to a shared (S) state.

The process then proceeds from block 132 to block 134, which illustrates cache controller 100 causing the status stored within shadow register 70 to be written back into the appropriate directory entry 64 in cache directory 60. Thereafter, the process terminates at block 136.

As has been described, the present invention provides an improved method and system; for data processing. According to a first aspect of the present invention, each requestor capable of issuing communication requests is permanently assigned a unique fixed bus tag that permits devices snooping a shared system bus (or other communication interconnect) to specifically identify the requester that initiated the communication transaction. In addition, in accordance with a second aspect of the present invention, a shadow register is provided within a cache in order to permit directory updates to be performed efficiently and with minimal contention. The shadow register functions as a virtual directory entry that is referenced to service cache operation requests during updates to a directory entry.

While the invention has been particularly shown and described with reference to a preferred embodiment, it will be understood by those skilled in the art that various changes in form and detail may be made therein without departing from the spirit and scope of the invention. For example, although the present invention has been described with respect to an illustrative embodiment that employs a shadow register in an L1 cache, those skilled in the art should appreciate from the foregoing description that a shadow register in accordance with the present invention can be employed at any level within the cache hierarchy. Furthermore, although the illustrative embodiment of a data processing system described herein employs fixed bus tags for communication over a shared system bus utilizing split bus transactions, the present invention is also applicable to other communication topologies and protocols.

What is claimed is:

1. A cache, comprising:

a plurality of data entries;

a cache directory that, for a particular data entry among said plurality of data entries, stores an address and a coherency status indication;

at least one shadow register;

means, responsive to receipt of a cache operation request specifying said address, for determining whether to update said coherency status indication;

means, responsive to determining to update said coherency status indication, for copying said coherency status indication into said shadow register;

means for updating said coherency status indication within said shadow register; and means for thereafter writing said updated coherency status indication from said shadow register into said cache directory.

2. The cache of claim 1, wherein said cache comprises a set associative cache.

3. The cache of claim 1, said cache operation request comprising a first cache operation request, said means for updating further comprising:

means, responsive to a second cache operation request, for again updating said coherency status indication in said shadow register prior to writing said updated coherency status indication into said cache directory.

4. The cache of claim 1, wherein said cache operation request is a first cache operation request, and said cache further comprises means, responsive to a second cache operation request specifying said address, for determining a coherency status of said particular data entry from said shadow register in response to a determination that said coherency status indication is to be updated and for otherwise determining said status from said cache directory.

5. A method of managing a cache including a plurality of data entries and a cache directory, said method comprising:

storing, within said cache directory, an address and a coherency status indication for a particular data entry among said plurality of data entries;

in response to receipt of a cache operation request specifying said address, determining whether to update said coherency status indication; and in response to said determination, copying said coherency status indication into a shadow register, updating said coherency status indication within said shadow register, and thereafter writing said updated coherency status indication from said shadow register into said cache directory.

6. The method of claim 5, said cache operation request comprising a first cache operation request, said method further comprising:

in response to a second cache operation request, again updating said coherency status indication in said shadow register prior to writing said updated coherency status indication into said cache directory.

7. The method of claim 5, said cache operation request comprising a first cache operation request, and said method further comprising:

in response to a second cache operation request, determining a coherency status of said particular data entry from said shadow register in response to a determination that said coherency status indication is to be updated and for otherwise determining said coherency status from said cache directory.

8. A cache, comprising:

a plurality of data entries;

a cache directory that, for a particular data entry among said plurality of data entries, stores an address and a coherency status indication;

at least one shadow register;

a cache controller that, responsive to receipt of a cache operation request specifying said address that requires an update to said coherency status indication, copies said coherency status indication into said shadow register, updates said coherency status indication within said shadow register, and thereafter writes said updated coherency status indication from said shadow register into said cache directory.

9. The cache of claim 8, wherein said cache comprises a set associative cache.

10. The cache of claim 8, wherein said cache operation request is a first cache operation request, and wherein said cache controller, responsive to a second cache operation request, again updates said coherency status indication in said shadow register prior to writing said updated coherency status indication into said cache directory.

11. The cache of claim 8, wherein said cache operation request is a first cache operation request, and wherein said cache controller, responsive to a second cache operation request specifying said address, determines a coherency status of said particular data entry from said shadow register in response to a determination that said coherency status indication is to be updated and for otherwise determining said status from said cache directory.

* * * * *